United States Patent
Ajiro (10) Patent No.: US 8,706,375 B2
(45) Date of Patent: Apr. 22, 2014

(54) BRAKING FORCE CONTROL DEVICE FOR VEHICLE

(75) Inventor: Keigo Ajiro, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/879,906

(22) PCT Filed: Sep. 30, 2011

(86) PCT No.: PCT/JP2011/072596
§ 371 (c)(1),
(2), (4) Date: Apr. 17, 2013

(87) PCT Pub. No.: WO2012/053339
PCT Pub. Date: Apr. 26, 2012

(65) Prior Publication Data
US 2013/0289845 A1    Oct. 31, 2013

(30) Foreign Application Priority Data

Oct. 20, 2010   (JP) ................................ 2010-235177

(51) Int. Cl.
*B60T 8/44*    (2006.01)
(52) U.S. Cl.
USPC .......................................... 701/70; 180/170
(58) Field of Classification Search
USPC .......... 701/70, 73, 78–79, 110; 188/137, 138, 188/182; 180/170
See application file for complete search history.

(56) References Cited

U.S. PATENT DOCUMENTS

| | | | | |
|---|---|---|---|---|
| 6,089,677 A * | 7/2000 | Fukumura et al. | ............ | 303/112 |
| 6,120,414 A * | 9/2000 | Endo et al. | ..................... | 477/185 |
| 6,219,610 B1* | 4/2001 | Araki | ............... | 701/72 |
| 6,324,457 B1* | 11/2001 | Minowa et al. | ................. | 701/70 |
| 8,255,137 B2* | 8/2012 | Jinno et al. | ...................... | 701/70 |
| 2007/0016352 A1* | 1/2007 | Tsunehara et al. | ............. | 701/70 |
| 2007/0276574 A1* | 11/2007 | Isaji et al. | ....................... | 701/70 |
| 2008/0106142 A1* | 5/2008 | Nishino et al. | .................. | 303/10 |
| 2010/0174430 A1* | 7/2010 | Irie | ................................ | 701/22 |

FOREIGN PATENT DOCUMENTS

| | | |
|---|---|---|
| JP | 11-301434 A | 11/1999 |
| JP | 2007-191092 A | 8/2007 |
| JP | 2010-179742 A | 8/2010 |

* cited by examiner

*Primary Examiner* — Mary Cheung
*Assistant Examiner* — Rodney Butler
(74) *Attorney, Agent, or Firm* — Global IP Counselors, LLP (57) ABSTRACT

A brake control device is provided for a vehicle that includes a brake pedal, an electric booster, a master cylinder, a pedal depression force calculator, a pedal stroke sensor, a first target braking force portion calculator, a second target braking force portion calculator, a contribution degree setting section and a target braking force calculator. The contribution degree setting section sets the contribution degree of a first target braking force based on a pedal depression force to be greater than a contribution degree of a second target braking force based on a pedal stroke when a target braking force is estimated to be low. The target braking force calculator calculates the first target braking force portion and the second target braking force portion according to the contribution degrees and obtains the final target braking force by adding the first target braking force portion and the second target braking force portion.

6 Claims, 7 Drawing Sheets

BRAKING FORCE CONTROL DEVICE FOR VEHICLE

CROSS-REFERENCE TO RELATED APPLICATIONS

This application is a U.S. National stage of International Application No. PCT/JP2011/072596, filed Sep. 30, 2011. This application claims priority to Japanese Patent Application No. 2010-235177, filed on Oct. 20, 2010. The entire disclosure of Japanese Patent Application No. 2010-235177 is hereby incorporated herein by reference.

BACKGROUND

1. Field of the Invention

The present invention relates to a brake force control device for a vehicle applied to electric vehicles or the like that obtains a force for assisting the pedal depression force according to an electric booster at a time of the braking operation.

2. Background Information

A conventional brake force control device for a vehicle is known that calculates the target braking force from the master cylinder pressure and the pedal stroke and changes the contribution degree of the two target brake forces according to at least either the master cylinder pressure or the pedal stroke (refer, for example, to Japanese Laid-Open Patent Publication No. H11-301434). In this brake force control, the contribution degree of the target deceleration rate calculated from the pedal stroke is increased in the region where the brake target value is low. On the other hand, the contribution degree of the target deceleration rate calculated from the master cylinder pressure is increased in the region where the brake target value is high.

SUMMARY

A well-known electric booster is applied to the brake operating mechanism of the conventional device described above as an assistor, and the pedal depression force and the assist pushing force are converted into the master cylinder pressure. In the case of this brake force control device provided with an electric booster, the contribution degree of the target deceleration rate that is calculated based on the pedal stroke is set to be large in the region where the brake target value is low. Consequently, there are the problems of not being able to achieve the intended deceleration rate with respect to the braking operation carried out with the pedal depression force and giving a feeling of discomfort to the driver during the braking operation at a time of a low brake target value, which is used often by the driver under normal driving conditions.

Namely, the relationship between the piston stroke and the master cylinder pressure may take on a relationship that varies from the design median value due to the variability. On the other hand, the electric booster is not inputting the pedal depression force directly to the master cylinder piston, as is the case in a negative pressure booster, is inputting the pedal depression force to the master cylinder piston from an input rod via the springs. Consequently, when the piston stroke for generating the same target deceleration rate varies according to the variability, the pedal depression force determined by the spring reactive force also varies. Therefore, when a control to generate the target deceleration rate based on the pedal stroke is carried out in the region where the brake target value is low, the pedal depression force for obtaining the same target deceleration rate varies according to the variability and gives a feeling of discomfort to the driver during the braking operation due to the deceleration rate intended by the driver not being achieved even when, for example, the braking operation with the same pedal depression force is carried out.

The present invention was conceived by focusing on the problems described above, and the object is to provide a brake force control device for a vehicle capable of reducing the occurrence of the brake target value varying in the braking operation with the same depression force at a time of a low brake target value which is often used by the driver under normal driving conditions, and preventing a feeling of discomfort given to the driver during the braking operation.

In order to achieve the object described above, a brake control device is provided for a vehicle that includes a brake pedal, an electric booster, a master cylinder, a pedal depression force calculator, a pedal stroke sensor, a first target braking force portion calculator, a second target braking force portion calculator, a contribution degree setting section and a target braking force calculator. The brake pedal receives a pedal depression force from a driver at a time of a brake operation. The electric booster assists the pedal depression force with a pushing force of an electric actuator. The master cylinder works as follows: the pedal depression force is inputted from an input rod to a master cylinder piston via a spring, an assist pushing force according to the electric booster is added to the pedal depression force, and a master cylinder pressure is generated and applied to wheel cylinders on each wheel. The pedal depression force calculator detects the pedal depression force applied to the brake pedal during the brake operation. The pedal stroke sensor detects the pedal stroke of the brake pedal during the brake operation. The controller includes a first brake target value calculator, a second brake target value calculator, a contribution degree setting section and a brake target value calculator. The first brake target value calculator calculates a first brake target value based on the pedal depression force. The second brake target value calculator calculates a second brake target value based on the pedal stroke. The contribution degree setting section sets a contribution degree of the first brake target value to be greater than a contribution degree of the second brake target value when a determined brake target value is estimated to be in a low region based on at least one of the pedal depression force and the pedal stroke. The brake target value calculator calculates a first brake target value portion and a second brake target value portion according to the contribution degrees set according to the contribution degree setting section and obtains a final brake target value by adding the first brake target value portion and the second brake target value portion.

Accordingly, at the time of the braking operation, the contribution degree setting section sets the contribution degree of the first brake target value based on the pedal depression force to be greater than the contribution degree of the second brake target value based on the pedal stroke when the brake target value is estimated to be low. Then, the first brake target value portion and the second brake target value portion are calculated according to the contribution degree that was set, and the final brake target value is obtained by adding the first brake target value portion and the second brake target value portion in the brake target value calculator. Namely, the final brake target value is calculated according to a contribution degree biased to the pedal depression force at the time the brake target value is low; therefore, the brake target value varying with respect to the braking operation with the same pedal depression force is decreased, as in the case where the final brake target value is calculated according to a contribution degree biased to the pedal stroke. As a result, the brake target value varying with respect to the braking operation with the same pedal depression force can be reduced at the time of a low brake target value, which is often used by the driver during normal driving conditions, and the feeling of discomfort given to the driver during the braking operation can be prevented.

DETAILED DESCRIPTION OF THE EMBODIMENTS

Below, the best modes for realizing the brake force control device for a vehicle in the present invention will be explained based on the first embodiment and the second embodiment.

First Embodiment

Figure 1:
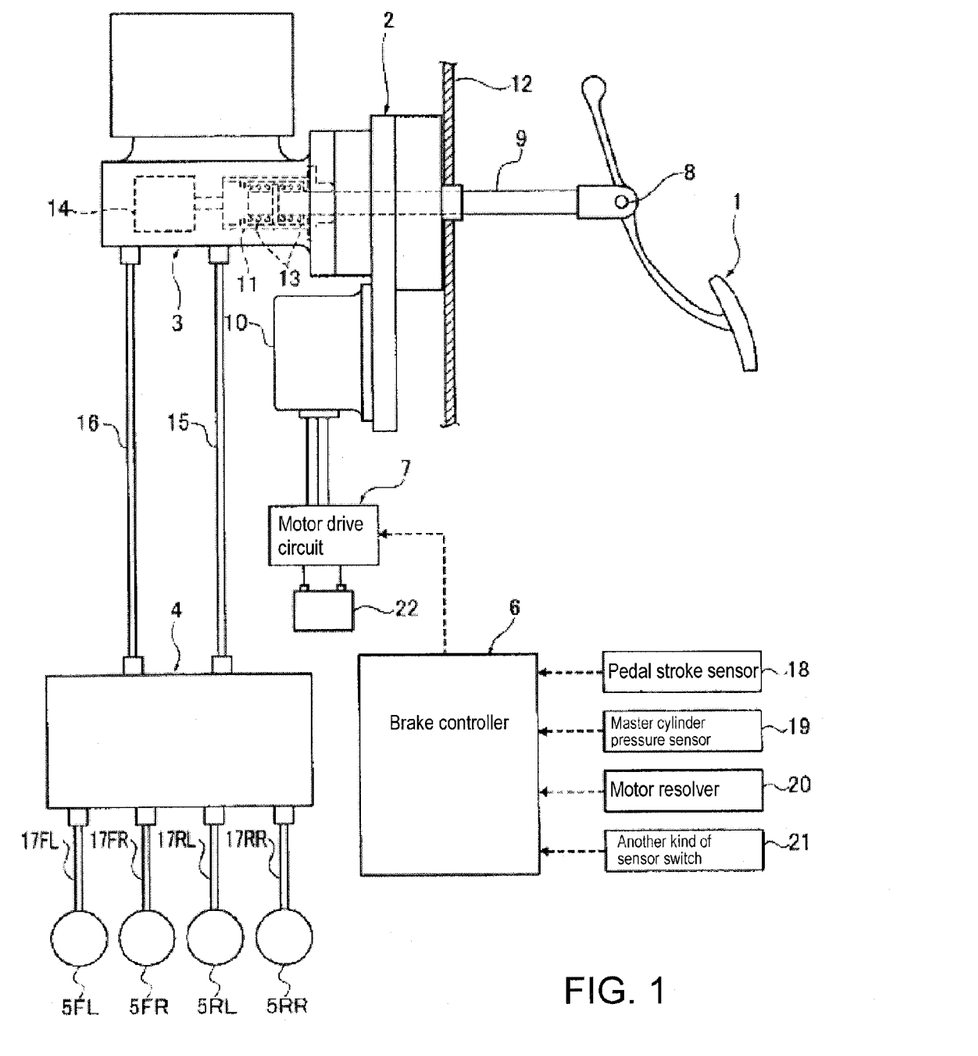
FIG. 1 is an overall system configuration illustrating the overall configuration of the brake force control device for a vehicle in the first embodiment.

First, the configuration of the first embodiment will be explained. FIG. 1 is an overall system configuration illustrating the overall configuration of the brake force control device for a vehicle in the first embodiment. Below, the overall configuration will be explained based on FIG. 1. The brake force control device for a vehicle in the first embodiment and the second embodiment is applied to an electric vehicle such as an electric car, a hybrid car, or the like.

The brake force control device for a vehicle in the first embodiment comprises a brake pedal 1, an electric booster 2, a master cylinder 3, a hydraulic brake actuator 4, the wheel cylinders 5 FL, 5 FR, 5 RL and 5 RR, a brake controller 6, and a motor driving circuit 7 as illustrated in FIG. 1.

At the time of the braking operation, the driver applies a pedal depression force to the brake pedal 1. The top end section of this brake pedal 1 is rotatably supported to the car body, and the middle section of the brake pedal 1 is coupled to the input rod 9 via a clevis pin 8.

The electric booster 2 assists the pedal depression force with the pushing force of the electric motor 10 (the electric actuator). This electric booster 2 converts the motor torque by means of the electric motor 10 into an assist pushing force with a bolt screw or the like and causes the assist pushing force to act on the primary piston 11 (the master cylinder piston). The electric booster 2 is fixed to the dash panel 12 along with the master cylinder 3.

The master cylinder 3 applies an assist pushing force by means of the electric motor 10 to the pedal depression force and generates a master cylinder pressure (a primary pressure and a secondary pressure) that is guided to the wheel cylinders 5 FL, 5 FR, 5 RL and 5 RR provided to each wheel. This master cylinder 3 has a primary piston 11 that inputs the pedal depression force applied to the input rod 9 via a pair of springs 13 and 13 and a secondary piston 14 integrally coupled to the primary piston 11. Then, the primary pressure created according to the piston stroke of the primary piston 11 is guided to the hydraulic brake actuator 4 via a primary pressure tube 15. The secondary pressure created according to the piston stroke of the secondary piston 14 is guided to the hydraulic brake actuator 4 via a secondary pressure tube 16.

The hydraulic brake actuator 4 guides the master cylinder pressure that was guided via the primary pressure tube 15 and the secondary pressure tube 16 at the time of a normal braking operation to the wheel cylinders 5 FL, 5 FR, 5 RL and 5 RR. When an ABS control accompanies the braking operation, the oil pressure wherein the master cylinder pressure had been reduced/maintained/intensified is guided to the wheel cylinders 5 FL, 5 FR, 5 RL and 5 RR. Also, when a VDC control or a TCS control does not accompany the braking operation, a control oil pressure based on the pump pressure by means of an electric pump is guided to the wheel cylinder that requires a control force from among the wheel cylinders 5 FL, 5 FR, 5 RL and 5 RR.

The wheel cylinders 5 FL, 5 FR, 5 RL and 5 RR are provided at the position of the brake device of each wheel and provide a control force to each wheel according to the wheel cylinder pressure that is guided via the wheel cylinder pressure tubes 17 FL, 17 FR, 17 RL and 17 RR.

The brake controller 6 determines the target braking force based on the pedal depression force and the pedal stroke at the time of the braking operation and outputs a motor drive signal to the motor driving circuit 7 so that an assist pushing force that achieves the target braking force is obtained. This brake controller 6 is input with the detection information from a pedal stroke sensor 18 (a pedal stroke detecting means) that detects the brake pedal stroke, a master cylinder pressure sensor 19, a motor resolver 20, and another kind of sensor switch 21.

The motor driving circuit 7 converts the power supply current (the power supply voltage) of a battery 22 into the drive current (the drive voltage) to be supplied to the electric motor 10 according to the motor drive signals from the brake controller 6.

Figure 2:
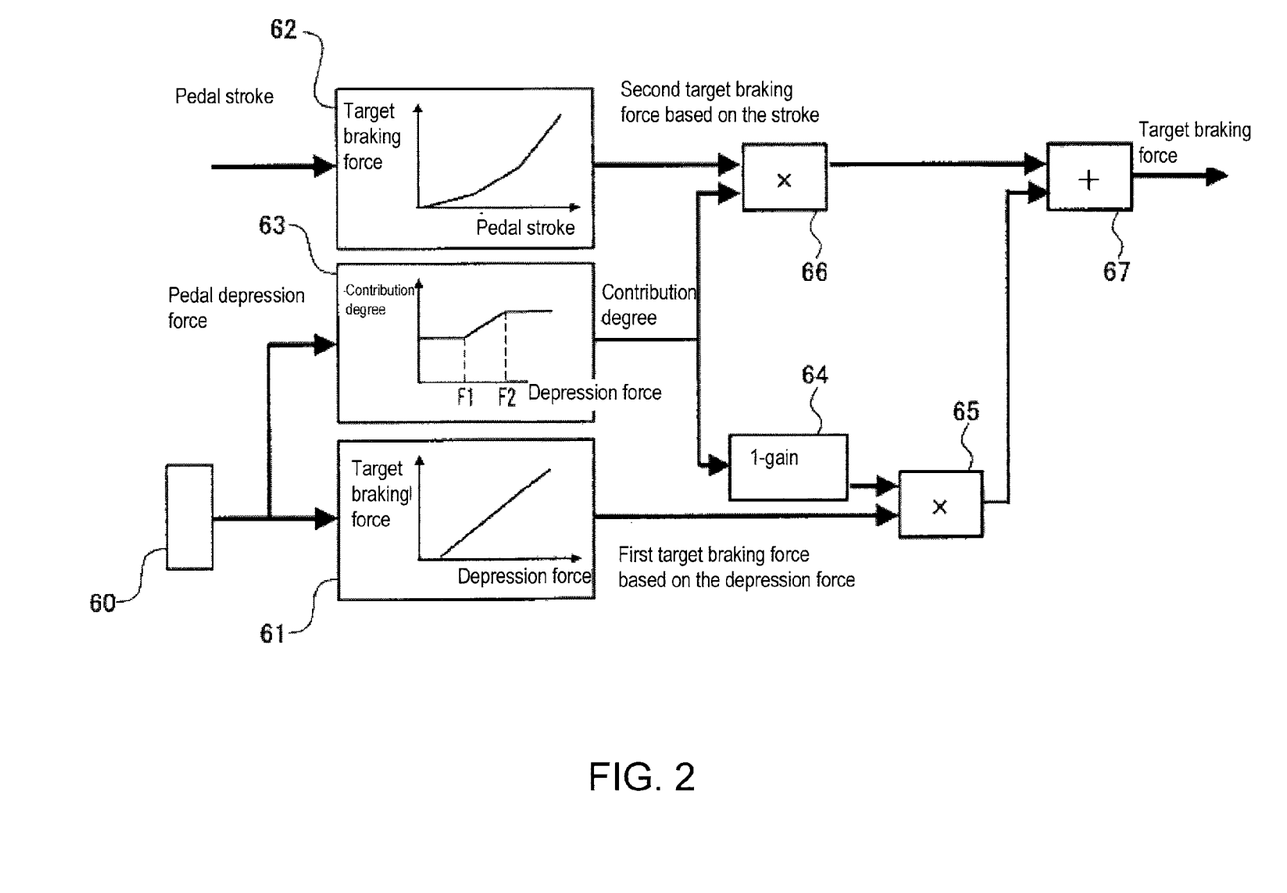
FIG. 2 is a control block diagram illustrating the brake controller in the brake force control device for a vehicle in the first embodiment.

FIG. 2 is a control block diagram illustrating the configuration of the main section of the brake controller 6 in the brake force control device for a vehicle in the first embodiment. Below, the configuration of the main section will be explained based on FIG. 2.

The brake controller 6 comprises a pedal depression force calculator 60 (a pedal depression force detecting means), a first target braking force calculator 61 (a first target braking force calculating means), a second target braking force calculator 62 (a second target braking force calculating means), a contribution degree setting section 63 (a contribution degree setting means), a first target braking force contribution degree calculator 64, a first target braking force portion calculator 65, a second target braking force portion calculator 66, and a target braking force calculator 67 (a brake target value calculating means) as illustrated in FIG. 2.

The pedal depression force calculator 60 calculates the pedal depression force applied to the brake pedal 1 by using the equation below:

> input from the rod input ($Fi$)=master cylinder pressure ($Pb$)×input rod area ($Ai$)+spring constant ($K$)×the relative displacement rate ($\Delta X$) of the input rod and the master cylinder piston with the input from the rod input ($Fi$) as the pedal depression force.

Here, the spring constant ($K$), according to the input rod area ($Ai$) of the input rod 9 and the pair of springs 13 and 13, is a known fixed value. The master cylinder pressure ($Pb$) is obtained from the master cylinder pressure sensor 19. As for the relative displacement ($\Delta X$), the position information of the input rod is obtained from the pedal stroke sensor 18, and the position information of the master cylinder piston is estimated from the motor rotating position obtained from the motor resolver 20. The difference between the position of the input rod and the position of the master cylinder is considered to be the relative displacement ($\Delta X$).

The first target braking force 61 inputs the pedal depression force from the pedal depression force calculator 60 and calculates the first target braking force portion based on the pedal depression force by using the proportional relationship characteristics of the target braking force with respect to the pedal depression force as disclosed within the frame.

The second target braking force calculator 62 inputs the pedal stroke from the pedal stroke sensor 18 and calculates the second target braking force portion based on the pedal stroke by using the curve characteristics of the target braking force portion with respect to the pedal stroke as disclosed within the frame.

The contribution degree setting section 63 inputs the pedal depression force from the pedal depression force calculator 60 and sets the contribution degree $\beta$ (=gain) of the second target braking force based on the pedal stroke on the basis of the pedal depression force (the brake target value) by using the contribution degree characteristics with respect to the pedal depression force as disclosed within the frame. The contribution degree characteristic sets the contribution degree $\beta$ at a fixed small value in the low brake target region wherein the pedal depression force F is 0 to F1. In the high brake target region wherein the pedal depression force F is F2~, the contribution degree $\beta$ is set at a fixed large value. In the middle brake target region wherein the pedal depression force F is F1 to F2, the contribution degree $\beta$ is set at a value that is gradually changed from a fixed small value to a fixed large value.

The first target braking force contribution degree calculator 64 calculates the contribution degree of the first target braking force based on the pedal depression force according to equation $(1-\beta)$. Namely, in the low brake target region, the contribution degree of the first target braking force based on the pedal depression force is set to be greater than the contribution degree of the second target braking force based on the pedal stroke.

The first target braking force portion calculator 65 calculates the first target braking force portion based on the pedal depression force by multiplying the first target braking force based on the pedal depression force obtained from the first target braking force calculator 61 and the contribution degree $(1-\beta)$ of the first target braking force based on the pedal depression force obtained from the first target braking force contribution degree calculator 64.

The second target braking force portion calculator 66 calculates the second target braking force portion, based on the pedal stroke by multiplying the second target braking force based on the pedal stroke obtained from the second target braking force calculator 62, and the contribution degree $\beta$ of the second target braking force, based on the pedal stroke obtained from the contribution degree setting section 63.

The target braking force calculator 67 calculates the final target braking force by adding the first target braking force portion, based on the pedal depression force obtained from the first target braking force portion calculator 65, and the second target braking force portion, based on the pedal stroke obtained from the second target braking force portion calculator 66.

Next, the operation will be explained.

First, the "problems of braking force control in the comparative examples" will be explained. Next, the operations in the brake force control device for a vehicle in the first embodiment will be explained by separating the explanation into a discussion on "the target braking force arithmetic operation" and a discussion on "the braking force control operation."

Problems of Braking Force Control in the Comparative Examples

The technology disclosed in the Japanese Laid-Open Patent Publication No. H11-301434 will be considered as Comparative Example 1, and the technology disclosed in the Japanese Laid-Open Patent Publication No. 2007-112426 will be considered as Comparative Example 2.

Comparative Example 1 calculates the target braking force from the master cylinder pressure and the pedal stroke, which are the inputs of the driver, and changes the contribution degree of two target braking forces according to at least either the master cylinder pressure or the pedal stroke. In the region where the target braking force is low, the contribution degree of the target deceleration rate calculated from the pedal stroke is set to be large. On the other hand, in the region where the target braking force is high, the contribution degree of the target deceleration rate calculated from the master cylinder pressure is set to be large.

Comparative Example 2 is a brake operation mechanism that employs an electric booster as the assistor, propels the master cylinder piston forward according to the electric booster, and generates a master cylinder pressure. This electric booster is configured to input the pedal depression force to the master cylinder piston from the input rod via the springs and inputs the assist pushing force to the master cylinder piston. Incidentally, the negative pressure booster known as an assistor is configured to directly input the pedal depression force and the assist pushing force to the master cylinder piston from the input rod.

Figure 3:
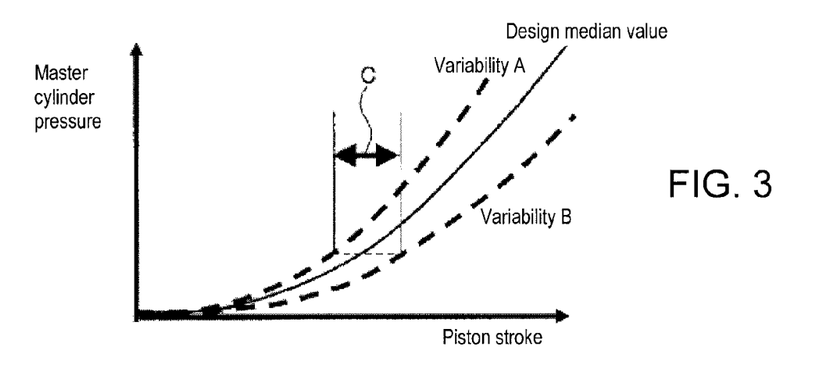
FIG. 3 is a characteristic diagram illustrating that the relationship of the master cylinder pressure with respect to the piston stroke is variable in a brake device for a vehicle.

First, the relationship between the amount of movement (the piston stroke) and the master cylinder pressure of the master cylinder piston may takes on a relationship that varies from the design median value due to the presence of variability in the components, the presence of an air mixture, the presence of a knock back of the brake caliper, or the like as illustrated in FIG. 3. Namely, "variability A" wherein the master cylinder pressure with respect to the piston stroke is made higher than the design median value and "variability B" wherein the master cylinder pressure with respect to the piston stroke is made lower than the design median value are generated. Consequently, varying the piston stroke is necessary in order to generate the same master cylinder pressure as illustrated with variability range C in FIG. 3.

Therefore, in a case where Comparative Example 1 is applied to Comparative Example 2, the target braking force based on the pedal stroke is mainly generated in the region where the target braking force is low. As a result, the desired master cylinder pressure can be obtained by making the piston stroke short at a time of "variability A" and making the piston stroke long at a time of "variability B."

However, the electric booster in Comparative Example 2 is configured to input the pedal depression force into the master cylinder piston from the input rod via the springs. Therefore, the following relationship exists > Input from the input rod ($Fi$)=master cylinder pressure ($Pb$)×input rod area ($Ai$)+spring constant ($K$)×the relative displacement ($\Delta X$) of the input rod and the master cylinder piston.

Incidentally, the equation for obtaining the input from the rod input is a conversion of the pressure equilibrium equation (1) in the gazette of Comparative Example 2. In this equation, "input from the input rod ($Fi$)" corresponds to the pedal depression force of the driver. "Master cylinder pressure ($Pb$)×input rod area ($Ai$)" corresponds to the hydraulic reactive force. "Spring constant ($K$)×the relative displacement ($\Delta X$)" corresponds to the spring reactive force.

Therefore, when Comparative Example 1 is applied to Comparative Example 2 and the target braking force based on the pedal stroke is generated, the relationship of the pedal depression force with respect to the target braking force may vary among the cases of "median value," the case of "variability A," and the case of "variability B."

For example, at the time of "variability A," the number of strokes the piston makes for outputting the same master cylinder pressure (the target braking force) is small; hence, the spring reaction force increases, and the input from the input rod (the pedal depression force) is increased by the amount of increase in the spring reaction force as illustrated in FIG. 3. Namely, at the time of "variability A," the pedal depression force for outputting the same target braking force is made greater than at the time of the "median value" as illustrated with D in FIG. 4. On the other hand, at the time of "variability B," the number of strokes the piston makes for outputting the same master cylinder pressure (the target braking force) is large; hence, the input from the input rod (the pedal depression force) is decreased by the amount of decrease in the spring reaction force as illustrated in FIG. 3. Namely, at the time of "variability B," the pedal depression force for outputting the same target braking force is decreased more than at the time of the "median value" as illustrated with E in FIG. 4.

Figure 5:
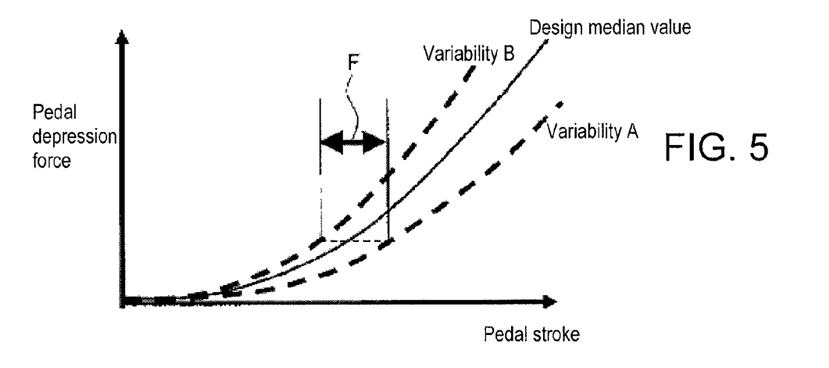
FIG. 5 is a characteristic diagram illustrating the relationship of the pedal depression force with respect to the pedal stroke in the case where the relationship of the master cylinder pressure with respect to the piston stroke is variable.

Specifically, in the case of an electric booster, the relative displacement ($\Delta X$) of the input rod and the master cylinder piston varies when the piston stroke varies. Therefore, the pedal stroke for outputting the same pedal depression force varies as illustrated with variability range F in FIG. 5.

Figure 4:
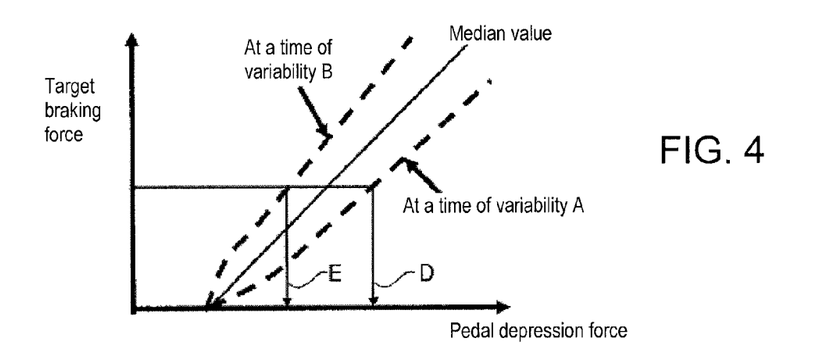
FIG. 4 is a characteristic diagram illustrating the relationship of the target brake force with respect to the pedal depression force in the case where the relationship of the master cylinder pressure with respect to the piston stroke is variable.

As a result, when a control is carried out to generate the target braking force based on the pedal stroke, the relationship between the pedal depression force applied by the driver and the master cylinder pressure, in other words, the relationship between the pedal depression force applied by the driver and the target braking force varies according to the variability (FIG. 4). Consequently, even if, for example, a braking operation is carried out with the same pedal depression force, the deceleration rate intended by the driver is not obtained, and a feeling of discomfort is given to the driver during the braking operation.

Target Braking Force Arithmetic Operation

First of all, in the contribution degree setting part 63, the pedal depression force is input from the pedal depression force calculator 60, and the contribution degree $\beta$ (=gain) of the second target braking force based on the pedal stroke is set on the basis of the pedal depression force by employing the contribution degree characteristic with respect to the pedal depression force as disclosed within the frame.

A fixed value of small contribution degree $\beta$ is set in the low brake target region wherein the pedal depression force F is 0 to F1. Then, the contribution degree $(1-\beta)$ of the first target braking force based on the pedal depression force is calculated in the first target braking force contribution ratio calculator 64, and the first brake target value portion is calculated in the first target braking force portion calculator 65 by multiplying $(1-\beta)$ and the first target braking force based on the pedal depression force. On the other hand, the second brake target value portion is calculated in the second target braking force portion calculator 66 by multiplying the contribution degree $\beta$ of the second target braking force based on the pedal stroke and the second target braking force based on the pedal stroke. Then, the final target braking force is calculated in the target braking force calculator 67 by adding the first target braking force portion and the second target braking force portion. Therefore, the final target braking force in the low brake target region is such that the contribution degree $(1-\beta)$ of the first target braking force based on the pedal depression force is a greater value than the contribution degree $\beta$ of the second target braking force based on the pedal stroke.

In the middle brake target region wherein the pedal depression force F is F1 to F2, the contribution degree $\beta$ is set at a value that gradually changes from a small fixed value to a large fixed value. Therefore, the final target braking force in the middle brake target region is such that the contribution degree $(1-\beta)$ of the first target braking force based on the pedal depression force gradually changes from a large value to a small value. On the contrary, the contribution degree $\beta$ of the second target braking force based on the pedal stroke gradually changes from a small value to a large value.

In the high brake target region wherein the pedal depression force F is F2~, the contribution degree $\beta$ is set at a large fixed value. Therefore, the final target braking force in the high brake target region is such that the contribution degree $\beta$ of the second target braking force based on the pedal stroke is a value greater than the contribution degree $(1-\beta)$ of the first target braking force based on the pedal depression force.

Namely, in the first embodiment, a configuration is employed wherein the contribution degree of the first target braking force based on the pedal depression force is set to be greater than the contribution degree of the second target braking force based on the pedal stroke at the time of the braking operation. Therefore, the target braking force varying with respect to a braking operation with the same pedal depression force, as in the case of calculating the final target braking force according to a contribution degree biased to the pedal stroke, is decreased by the final target braking force being calculated according to a contribution degree biased to the pedal depression force at the time of a low pedal depression force. Consequently, the target braking force varying with respect to a braking operation with the same pedal depression force is decreased at the time of a low brake target value used often by the driver under normal driving conditions, and the feeling of discomfort given to the driver during the braking operation is prevented.

[Braking Force Control Operation]

Figure 6:
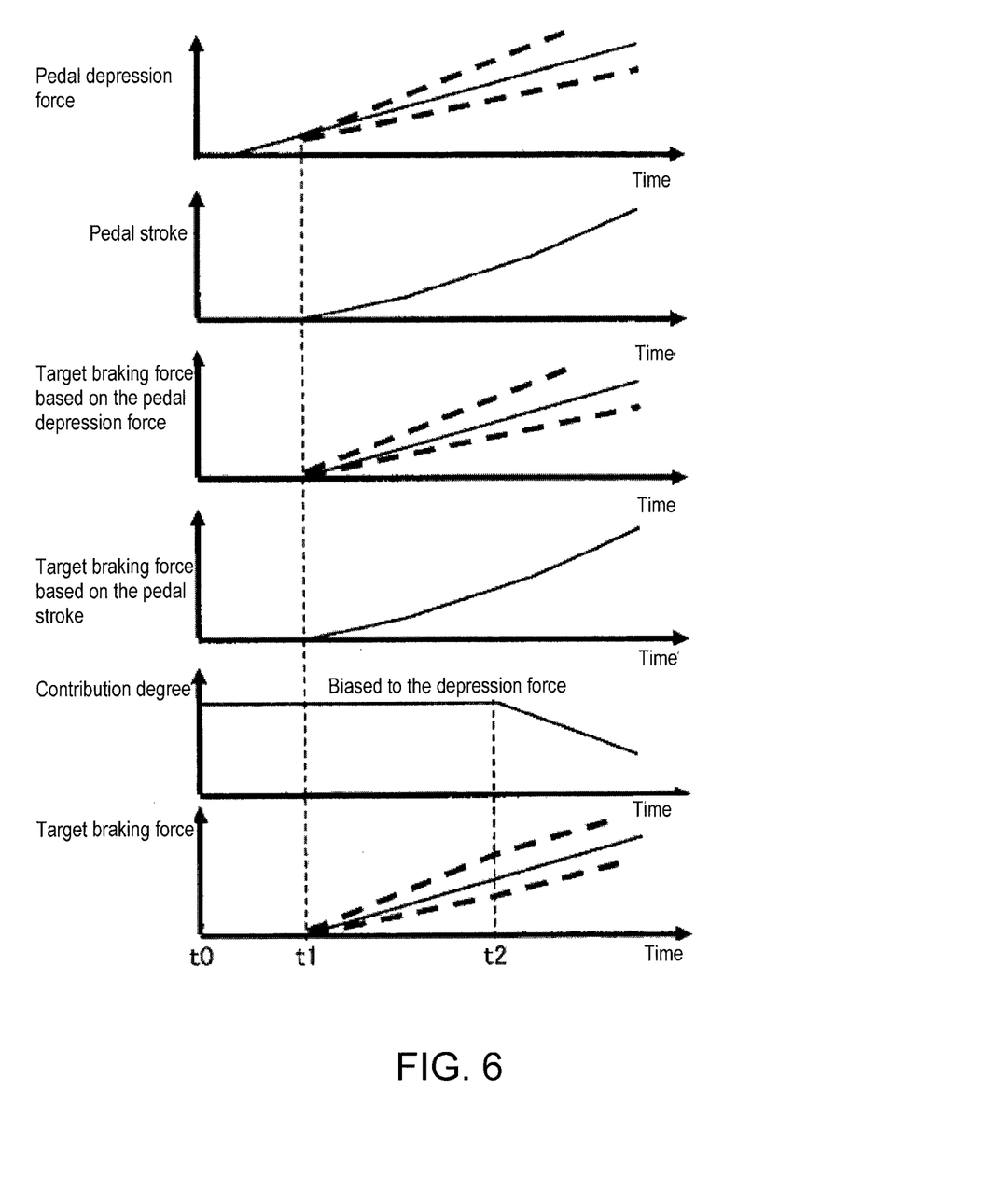
FIG. 6 is a time chart illustrating the characteristics of the pedal depression force at the time of the braking operation, the pedal stroke, the target braking force based on the pedal depression force, the target brake force based on the pedal stroke, the contribution degree, and the target brake force in an electric vehicle mounted with the brake force control device for a vehicle in the first embodiment.

The braking force control operation in a case where a braking operation is executed in a vehicle that employed a braking force control that carries out a target braking force arithmetic will be explained based on the time chart illustrated in FIG. 6.

When the braking operation is started at time t0, the pedal depression force characteristic indicates a characteristic of ascending proportionally in a straight line with a lapse in time. In this pedal depression force characteristic, the solid line characteristic is the median value, the upper broken line characteristic is the case of variability B, and the lower broken line characteristic is the case of variability A.

When the braking operation is started at time t0, the pedal stroke characteristic indicates a characteristic that ascends in an N-order curve with the lapse in time.

The target braking force based on the pedal depression force indicates a characteristic that ascends proportionally in a straight line with the lapse in time from time t1. In this target braking force characteristic based on the pedal depression force, the solid line characteristic is the median value, the upper broken line characteristic is the case of variability B, and the lower broken line characteristic is the case of variability A.

The target braking force based on the pedal stroke indicates a characteristic of ascending in an N-order curve with the lapse in time from time t1.

In the case of the first embodiment, the contribution degree is provided by being biased to the pedal depression force at the time of a low brake target region from time t0 to time t2, and the contribution degree of the pedal depression force is provided according to a characteristic wherein the contribution degree of the pedal depression force decreases from time t2.

Therefore, the relationship between the pedal depression force and the target braking force is maintained to conform with the characteristic of the target braking force based on the pedal depression force that was determined according to the variability, and the target braking force varying with respect to a braking operation with the same pedal depression force is decreased due to the target braking force being provided by being biased to the pedal depression force from time t1 to time t2. Moreover, the period between time t1 to time t2 is a period of low brake target value often, which is used by the driver under normal driving conditions. Therefore, the effect of preventing the feeling of discomfort given to the driver during the braking operation can be manifested effectively.

Next, the effects will be explained. The effects enumerated below can be obtained in the brake force control device for a vehicle in the first embodiment.

(1) The brake force control device for a vehicle in the first embodiment includes a brake pedal 1 that applies a pedal depression force F from the driver at the time of the braking operation, an electric booster 2 that assists the pedal depression force F with the pushing force of the electric actuator (the electric motor 10), a master cylinder 3 that inputs the pedal depression force F to the master cylinder piston (the primary piston 11) from the input rod 9 via the springs 13 and 13, applies an assist pushing force to the pedal depression force F according to the electric booster 2, and generates a master cylinder pressure that is guided to the wheel cylinders 5 FL, 5 FR, 5 RL and 5 RR provided to each wheel, a pedal depression force calculator 60 (a pedal depression force detecting means) that detects the pedal depression force F applied to the brake pedal 1, a pedal stroke detecting means (a pedal stroke sensor 18) that detects the pedal stroke applied to the brake pedal 1, a first brake target value calculating means (a first brake target value calculator 61) that calculates the first brake target braking force (the first brake target value) based on the pedal depression force F, a second brake target value calculating means (a second target braking force calculator 62) that calculates the second brake target value (the second target braking force) based on the pedal stroke, a contribution degree setting means (a contribution degree setting section 63) that sets the contribution degree $(1-\beta)$ of the first brake target value (the first target braking force) to be greater than the contribution degree $\beta$ of the second brake target value (the second target braking force) when the brake target value (the target braking force) is estimated to be low, and a brake target value calculating means (a target braking force calculator 67) that calculates the first brake target value portion (the first target braking force portion) and the second brake target value portion (the second target braking force portion) according to the contribution degree $(1-\beta)$; $\beta$ is set according to the contribution degree setting means (the contribution degree setting section 63) and obtains the final brake target value (the target braking force) by adding the first brake target value portion (the first target braking force portion) and the second brake target value portion (the second target braking force portion).

Consequently, the brake target value (the target braking force) varying with respect to the braking operation with the same pedal depression force is decreased at the time of a low brake target value (the target braking force) used often by the driver under normal driving conditions, and the feeling of discomfort given to the driver during the braking operation can be prevented.

(2) The pedal depression force detecting means (the pedal depression force calculator 60) calculates the input from the input rod (Fi) as the pedal depression force F by using the following the equation:

Input from the input rod $(Fi)$=master cylinder pressure $(Pb)$×input rod area $(Ai)$+spring constant $(K)$×the relative displacement $(\Delta X)$ of the input rod and the master cylinder piston.

Consequently, in addition to the effects in (1), pedal depression force information can be obtained while avoiding a cost increase from adding sensors by using the information from the existing sensors.

Second Embodiment

The second embodiment is an example that changes the contribution degree based on the pedal depression force at the time the brake operating speed is quick.

First, the configuration will be explained.

Figure 7:
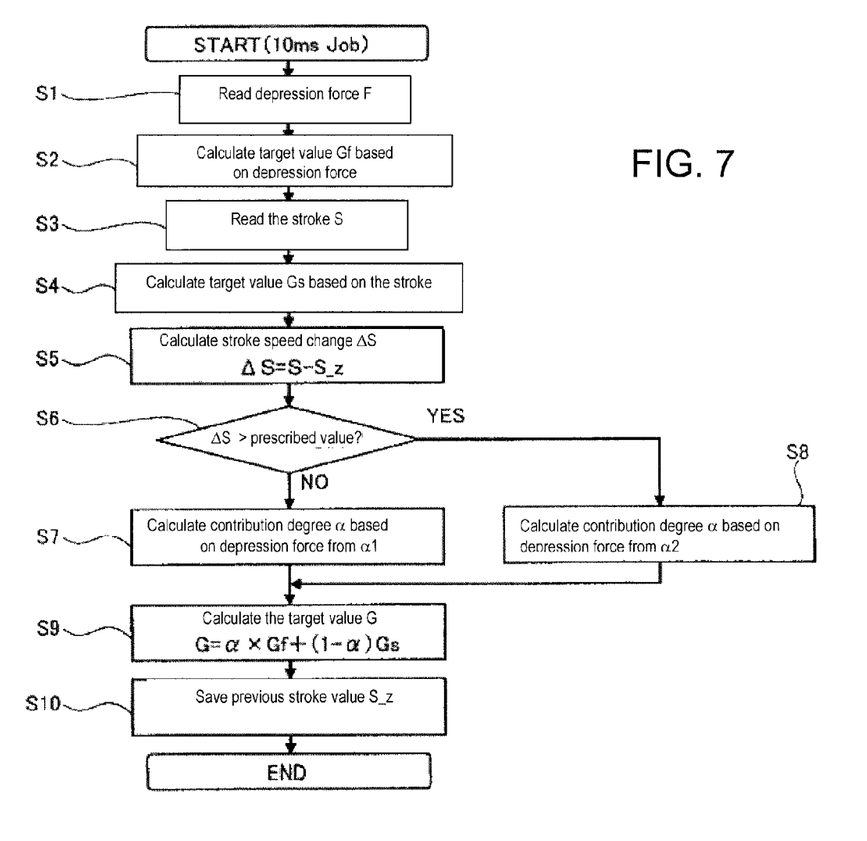
FIG. 7 is a flow chart illustrating the configuration and the flow of the brake force control processing carried out in the brake controller of the brake force control device for a vehicle in the second embodiment.

The overall configuration in the second embodiment is the same as that in FIG. 1 of the first embodiment. Therefore, an illustration with a Figure will be omitted. FIG. 7 is a flow chart illustrating the configuration and the flow of the brake force control processing carried out in the brake controller 6 of the brake force control device for a vehicle in the second embodiment. Below, each step in FIG. 7 will be explained. This operation is carried out according to an activation cycle of, for example, 10 msec.

In step S1, the pedal depression force F is read, and the operation advances to step S2. This pedal depression force F is obtained according to a calculation from a separate flow chart, as was the case in the first embodiment.

In step S2, the target value Gf based on the pedal depression force F is calculated after reading the pedal depression force F in step S1, and the operation advances to step S3 (the first brake target value calculating means). This target value Gf based on the pedal depression force F is calculated in the same manner as in the first target braking force calculator 61 in the first embodiment.

In step S3, the pedal stroke S is read after calculating the target value Gf based on the pedal depression force F in step S2, and the operation advances to step S4. This pedal stroke S is obtained according to the sensor signals from the pedal stroke sensor 18 as in the first embodiment.

In step S4, the target value Gs based on the pedal stroke S is calculated after reading the pedal stroke S in step S3, and the operation advances to step S5 (the second brake target value calculating means). This target value Gs based on the pedal stroke S is calculated in the same manner as the second target braking force calculator 62 in the first embodiment.

In step S5, the stroke speed change $\Delta S$ is calculated after calculating the target value Gs based on the pedal stroke S in step S4, and the operation advances to step S6 (the brake operating speed calculating means).

Here, the stroke speed change $\Delta S$ is obtained with the following equation $\Delta S = S - S\_z$ S: Current pedal stroke value, $S\_z$: previous pedal stroke value.

In step S6, a determination is made regarding whether or not the stroke speed change $\Delta S$ is greater than a prescribed value after calculating the stroke speed change $\Delta S$ in step S5. If the determination is YES ($\Delta S >$ prescribed value), the operation advances to step S8; if the determination is NO ($\Delta S <$ prescribed value), the operation advances to step S7 (the contribution degree setting means). Here, the prescribed value is provided as a threshold value for making a determination regarding whether or not the braking operation is a quick depressing operation.

Figure 8:
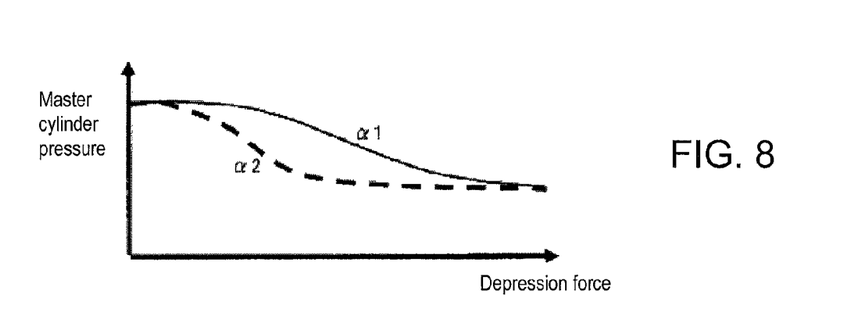
FIG. 8 is a contribution degree characteristic diagram illustrating the first contribution degree characteristic and the second contribution degree characteristic that are based on the depression force in the brake force control processing in the brake force control device for a vehicle in the second embodiment.

In step S7, the contribution degree a based on the pedal depression force is calculated from the first contribution degree characteristic α1 illustrated in FIG. 8 after a determination of $\Delta S$ is less than or equal to the prescribed value is made in step S6, and the operation advances to step S9 (the contribution degree setting means). Here, the first contribution degree characteristic α1 that is selected when $\Delta S$ is less than or equal to the prescribed value is the characteristic that sets the contribution degree of the target value Gf based on the pedal depression force F to be greater than the contribution degree of the target value Gs based on the pedal stroke S on the side that the pedal depression force is low as illustrated in FIG. 8. Namely, the characteristic is set to be the same characteristic of the contribution degree setting section 63 in the first embodiment.

In step S8, the contribution degree a based on the pedal depression force is calculated from the second contribution degree characteristic α2 illustrated in FIG. 8 after making a determination that $\Delta S$ is greater than the prescribed value in step S6, and the operation advances to step S9 (the contribution degree setting means). Here, the second contribution degree characteristic α2 that is selected when $\Delta S$ is greater than the prescribed value is the characteristic that sets the contribution degree of the target value Gs based on the pedal stroke S to be greater than the first contribution degree characteristic α1. Namely, the characteristic is set such that the contribution degree a based on the pedal depression force is controlled earlier than the first contribution degree characteristic α1 with respect to an increase in the pedal depression force.

In step S9, the target value G is calculated on the basis of the contribution degree a based on the pedal depression force, the target value Gf based on the pedal depression force F, and the target value Gs based on the pedal stroke S after calculating the contribution degree a based on the pedal depression force in step S7 or step S8, and the operation advances to step S10 (the brake target value calculating means).

Target value G is calculated according to the following equation $$G = \alpha \times Gf + (1-\alpha)Gs.$$

In step S10, the pedal stroke S that was read this time is saved as the previous stroke value S_z after calculating the target value G in step S9, and the operation ends.

Next, the operation will be explained. In a case where the driver quickly enacts the brake pedal operation on the increase side (the depressing side), an increase in the master cylinder pressure is delayed according to the delay in the response of the brake system.

In addition, the electric booster 2 is configured to input the pedal depression force to the primary piston 11 from the input rod 9 via the springs 13 and 13. Therefore, the following relationship exists Input from the input rod (Fi)=master cylinder pressure (Pb)×input rod area (Ai)+spring constant (K) of springs 13 and 13×the relative displacement ($\Delta X$) of the input rod 9 and the primary piston 11.

Figure 9:
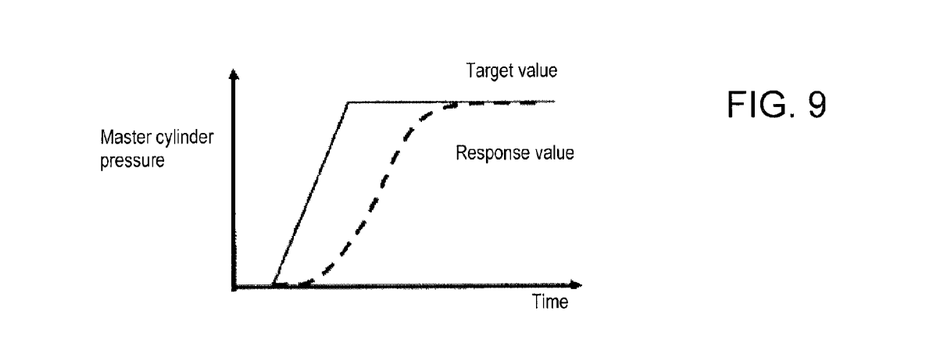
FIG. 9 is a master cylinder pressure response characteristic diagram illustrating the time change in the target value and the response value of the master cylinder pressure in the brake force control device for a vehicle in the second embodiment.
Figure 10:
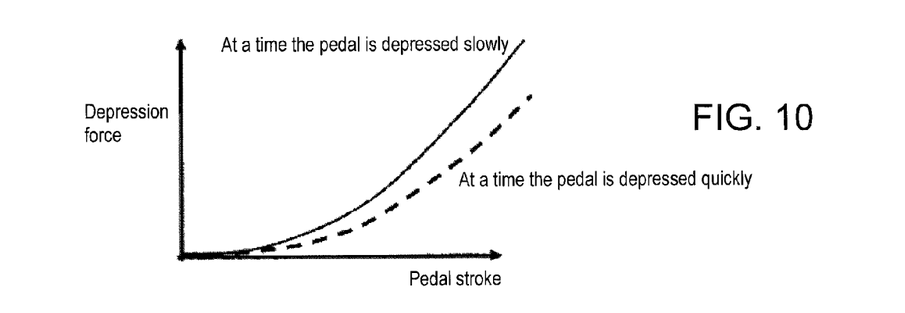
FIG. 10 is a characteristic diagram illustrating a different relationship of the depression force with respect to the pedal stroke in the case where the brake operating speed is varied in the brake force control device for a vehicle in the second embodiment.

Consequently, an increase in the input from the input rod (Fi) is delayed. Namely, the master cylinder pressure characteristic is such that a response delay is generated when the pedal depression force is quick, as is apparent from the response value indicated with the broken line characteristic and the target value indicated with the solid line characteristic in FIG. 9. As a result of the delay in the response of the master cylinder pressure, a longer stroke results with a small pedal depression force when the pedal is depressed quickly (the broken line characteristic in FIG. 10) in comparison to when the pedal is depressed slowly (the solid line characteristic in FIG. 10). Accordingly, a delay is generated with respect to the driver's quick brake depression (sudden braking or the like) as a result of the delay in increasing the target value based on the pedal depression force, and there is a concern of giving a feeling of dissatisfaction to the driver.

On the contrary, in the second embodiment, the contribution degree $(1-\alpha)$ of the target value Gs based on the pedal stroke was made to be greater the quicker the brake pedal operation is on the increase side. Therefore, the target value G can be suitably increased with respect to a quick pedal depressing operation.

Namely, at a time of a quick pedal depressing operation, the operation that advances in the order of step S1→step S2→step S3→step S4→step S5→step S6→step S7→step S8→step S9→step S10→End in the flow chart of FIG. 7 is repeated.

Then, in step S8, the contribution degree a based on the pedal depression force is calculated from the second contribution degree characteristic $\alpha 2$ (FIG. 8) that set the contribution degree of the target value Gs based on the pedal stroke S to be greater than the first contribution degree characteristic $\alpha 1$.

Figure 11:
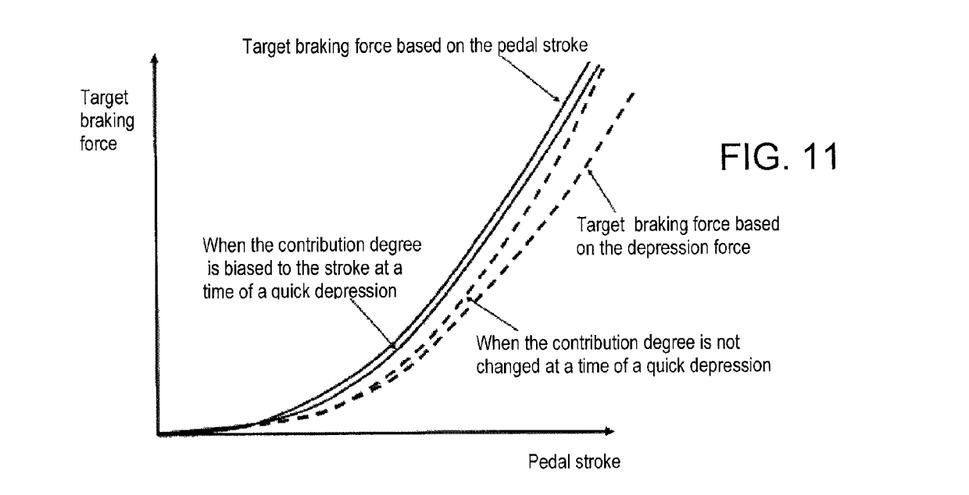
FIG. 11 is a characteristic diagram illustrating the different relationships of the target braking force with respect to the pedal stroke when the relationship is based on the pedal stroke, when the relationship is based on the depression force, when the contribution degree is biased to the stroke at a time of a quick depression, and when the contribution degree is not changed at a time of a quick depression.

Therefore, when the target braking force is obtained based on the pedal depression force or when the contribution degree is not changed at a time of a quick depression, an increase in the target braking force is delayed with respect to the increase in the pedal stroke, and a delay is generated with respect to a sudden braking made by the driver according to a quick brake depression, as illustrated with the broken line characteristics in FIG. 11 at the time of a quick pedal depressing operation.

On the contrary, when the contribution degree is biased to the stroke at the time of a quick depression, the target braking force is suitably increased with respect to the increase in the pedal stroke, as in the case of obtaining the target braking force based on the pedal stroke, and a sudden braking made by the driver according to a quick brake depression can be responded to as illustrated with the solid line characteristic in FIG. 11 at the time of a quick pedal depressing operation.

At the time of a slow pedal depressing operation, the operation that advances in the order of step S1→step S2→step S3→step S4→step S5→step S6→step S7→step S8→step S9→step S10→End in the flow chart of FIG. 7 is repeated, and this indicates the same operation as in the first embodiment. Therefore, the explanation will be omitted.

Next, the effects will be explained. In the brake force control device for a vehicle in the second embodiment, the effects enumerated below can be obtained.

(3) A brake operating speed calculating means (a stroke speed change calculating step S5) that calculates the brake operating speed (the stroke speed change $\Delta S$), which is the change in the brake pedal operating speed made by the driver, is included and the contribution degree setting means (step S6 the step S8 in FIG. 7) changes and sets the contribution degree such that the contribution degree $(1-\alpha)$ of the second brake target value (the target value Gs based on the pedal stroke) is made greater the greater that the brake operating speed (the stroke speed change $\Delta S$) is on the increase side. Consequently, in addition to the effects of (1) or (2) in the first embodiment, a sudden braking request made by the driver can be responded to at the time of a quick pedal depressing operation.

(4) The contribution degree setting means (step S6 to step S8 in FIG. 7) selects the first contribution degree characteristic $\alpha 1$ that sets the contribution degree a of the first brake target value (the target value Gf based on the pedal depression force) on the side where the brake target value (the pedal depression force) is low to be greater than the contribution degree $(1-\alpha)$ of the second brake target value (the target value Gs based on the pedal stroke) when the brake operating speed (the stroke speed change $\Delta S$) is equal to or below a prescribed value and selects the second contribution degree characteristic $\alpha 2$ that sets the contribution degree $(1-\alpha)$ of the second brake target value (the target value Gs based on the pedal stroke) to be greater than the first contribution degree characteristic $\alpha 1$ when the brake operating speed (the stroke speed change $\Delta S$) is equal to or greater than a prescribed value (FIG. 8). Consequently, in addition to the effects in (3), it is possible to achieve both the effect of preventing a feeling of discomfort during a braking operation on the side where the brake target value is low and of securing a responsiveness with respect to a sudden breaking request according to a simple configuration that makes a selection between the contribution degree characteristics $\alpha 1$ and $\alpha 2$ on the basis of whether the brake operating speed (the stroke speed change $\Delta S$) is less than or greater than a prescribed value.

The brake force control device for a vehicle in the present invention was explained above based on the first embodiment and the second embodiment. However, the specific configuration is not restricted to these embodiments and changes, additions, or the like in the design are allowed as long as the changes, additions, or the like do not deviate from the essence of the inventions related to the claims.

Figure 12:
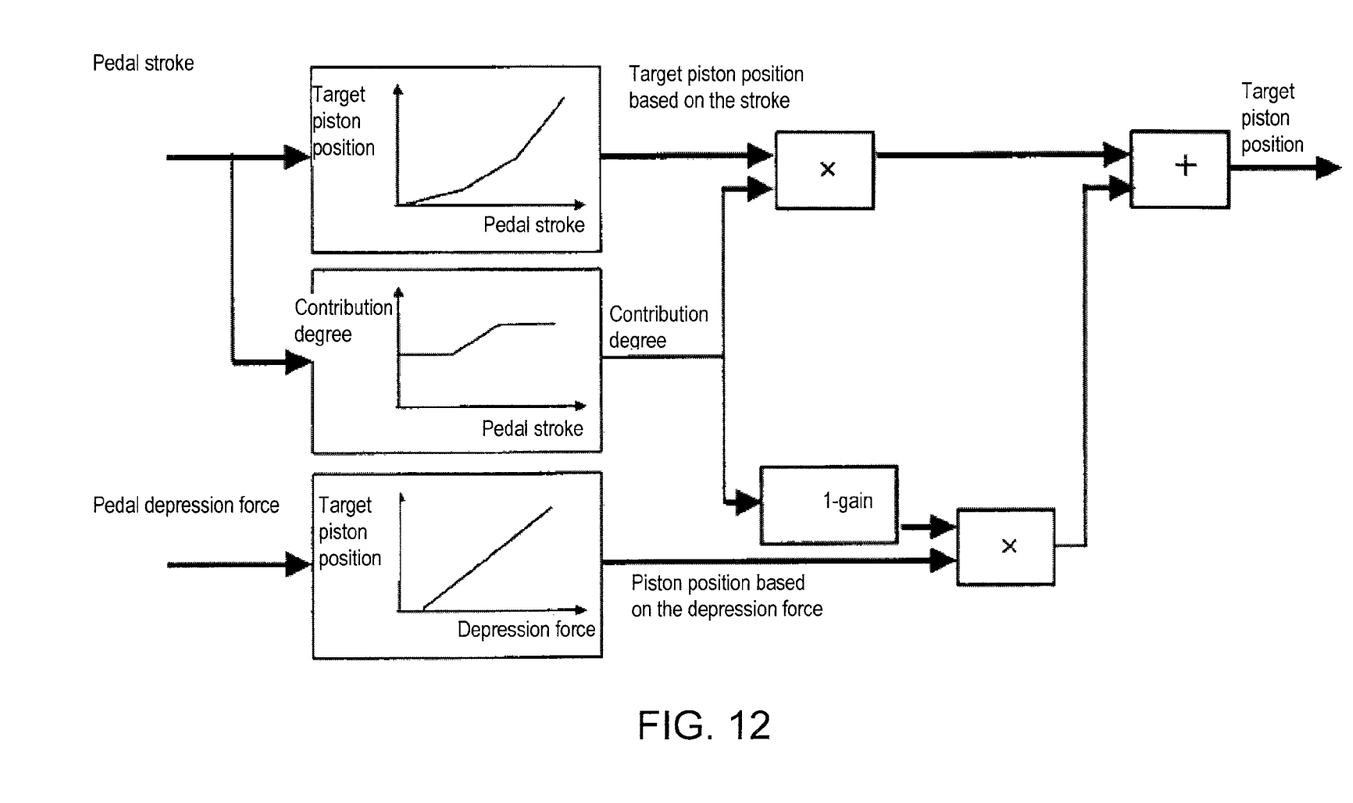
FIG. 12 is a control block diagram illustrating the configuration of the main section of the brake controller in an example where the brake target is the piston position instead of the target braking force.

An example that uses the target braking force as the brake target value was described in the first embodiment, and an example that uses the target deceleration rate G as the brake target value was described in the second embodiment. However, the brake target value is not limited to the target braking force and the target deceleration rate, and it is possible to use the physical rate of the force applied to the vehicle such as the master cylinder pressure, the position of the master cylinder piston, or the like. For example, the control block diagram illustrated in FIG. 12 is what replaced the target braking force in the first embodiment with the target piston position. This is made possible by controlling the master cylinder pressure indirectly by controlling the position of the master cylinder piston.

In the first and second embodiments, an example of changing the contribution degree by supposing that the brake target value is smaller the smaller that the pedal depression force is in calculating the contribution degree was shown. In the example illustrated in FIG. 12, an example that changes the contribution degree by supposing that the brake target value is smaller the smaller that the pedal stroke is in calculating the contribution degree was shown. However, it is possible to estimate the brake target value according to either the pedal depression force or the pedal stroke or both. This possibility was discovered as a result of the development that estimating the brake target value based on the pedal depression force is more favorable than estimating the brake target value based on the pedal stroke.

In the first and second embodiments, an example of obtaining the pedal depression force from the driver according to a calculation that used an equation of the input from the input rod (Fi) was shown. However, it is possible to detect the pedal depression force from the driver according to a method of directly detecting the pedal depression force by providing a strain gauge or the like to the input rod, the pedal lever, or the like.

In the first and second embodiments, an example of applying the brake force control device for a vehicle in the present invention to an electric vehicle such as an electric car, a hybrid car, or the like was shown. However, it is possible to apply the present invention to an engine vehicle that employed a brake system that uses an electric booster as the assistor.

The invention claimed is:
1. A brake force control device for a vehicle comprising:
a brake pedal that receives a pedal depression force from a driver at a time of a brake operation;
an electric booster that assists the pedal depression force with a pushing force of an electric actuator;
a master cylinder that works as follows: the pedal depression force is inputted from an input rod to a master cylinder piston via a spring, an assist pushing force according to the electric booster is added to the pedal depression force, and a master cylinder pressure is generated and applied to wheel cylinders on each wheel;

a pedal depression force calculator that detects the pedal depression force applied to the brake pedal during the brake operation;

a pedal stroke sensor that detects the pedal stroke of the brake pedal during the brake operation; and a controller including
a first brake target value calculator that calculates a first brake target value based on the pedal depression force;
a second brake target value calculator that calculates a second brake target value based on the pedal stroke;
a contribution degree setting section that sets a contribution degree of the first brake target value to be greater than a contribution degree of the second brake target value when a determined brake target value is estimated to be a low region based on at least one of the pedal depression force and the pedal stroke; and
a brake target value calculator that calculates a first brake target value portion and a second brake target value portion according to the contribution degrees set according to the contribution degree setting section and obtains a final brake target value by adding the first brake target value portion and the second brake target value portion.

2. The brake force control device according to claim 1, wherein
the pedal depression force calculator calculates an input from the input rod (Fi) as the pedal depression force by using the equation below:

input from the input rod ($Fi$)=the master cylinder pressure ($Pb$)×input rod area ($Ai$)+a spring constant ($K$)×a relative displacement ($\Delta X$) of the input rod and the master cylinder piston.

3. The brake force control device according to claim 1, wherein
the controller further includes a brake operating speed calculator for calculating a brake operating speed, which is a speed at which the brake pedal is depressed by the driver, and
the contribution degree setting section changing and setting the contribution degrees such that the contribution degree of the second brake target value is made greater as the braking operating speed becomes greater.

4. The brake force control device according to claim 3, wherein
the contribution degree setting section selects a first contribution degree characteristic that sets the contribution degree of the first brake target value to be greater than the contribution degree of the second brake target value where the brake target value is low when the brake operating speed is equal to or less than a prescribed value, and selects a second contribution degree characteristic that sets the contribution degree of the second brake target value to be greater than the first contribution degree characteristic when the brake operating speed is greater than the prescribed value.

5. The brake force control device according to claim 2, wherein
the controller further includes a brake operating speed calculator for calculating a brake operating speed, which is a speed at which the brake pedal is depressed by the driver, and
the contribution degree setting section changing and setting the contribution degrees such that the contribution degree of the second brake target value is made greater as the braking operating speed becomes greater on the increasing side.

6. The brake force control device according to claim 5, wherein
the contribution degree setting section selects a first contribution degree characteristic that sets the contribution degree of the first brake target value to be greater than the contribution degree of the second brake target value at the side where the brake target value is lower when the brake operating speed is equal to or less than a prescribed value, and selects a second contribution degree characteristic that sets the contribution degree of the second brake target value to be greater than the first contribution degree characteristic when the brake operating speed is greater than the prescribed value.

* * * * *